United States Patent
Chang-Hasnain et al.

(10) Patent No.: US 8,442,374 B2
(45) Date of Patent: May 14, 2013

(54) ULTRA-LOW LOSS HOLLOW CORE WAVEGUIDE USING HIGH-CONTRAST GRATINGS

(75) Inventors: Connie Chang-Hasnain, Palo Alto, CA (US); Ye Zhou, Shanghai (CN); Vadim Karagodsky, Berkeley, CA (US); Forrest G. Sedgwick, Berkeley, CA (US); Michael Chung-Yi Huang, Taipei (TW)

(73) Assignee: The Regents of the University of California, Oakland, CA (US)

( * ) Notice: Subject to any disclaimer, the term of this patent is extended or adjusted under 35 U.S.C. 154(b) by 183 days.

(21) Appl. No.: 13/109,205

(22) Filed: May 17, 2011

(65) Prior Publication Data

US 2011/0280533 A1    Nov. 17, 2011

Related U.S. Application Data

(63) Continuation of application No. PCT/US2009/065840, filed on Nov. 25, 2009.

(60) Provisional application No. 61/117,578, filed on Nov. 25, 2008, provisional application No. 61/143,906, filed on Jan. 12, 2009.

(51) Int. Cl.
*G02B 6/34* (2006.01)
*G02B 6/036* (2006.01)
*G02B 6/10* (2006.01)

(52) U.S. Cl.
USPC .............................. 385/129; 385/37; 385/131

(58) Field of Classification Search .................. 385/37, 385/129, 130, 131, 146, 147, 27, 28
See application file for complete search history.

(56) References Cited

U.S. PATENT DOCUMENTS

| | | | |
|---|---|---|---|
| 5,333,216 A * | 7/1994 | Sakata et al. | 385/28 |
| 6,501,776 B1 * | 12/2002 | Numai | 372/45.01 |
| 6,628,861 B1 | 9/2003 | Yao | |
| 7,619,816 B2 * | 11/2009 | Deng et al. | 359/484.01 |

(Continued)

FOREIGN PATENT DOCUMENTS

EP    1 742 314 A2    1/2007

OTHER PUBLICATIONS

Ou, H.—"Different index contrast silica-on-silicon waveguides by PECVD"—Electronics Letters, vol. 39, No. 2, Jan. 23, 2003, pp. 212-213.

(Continued)

*Primary Examiner* — Akm Enayet Ullah
(74) *Attorney, Agent, or Firm* — John P. O'Banion

(57) ABSTRACT

Optical waveguides using segmented periodically-spaced high contrast gratings bounding a hollow core propagation region on at least two sides. Incident light is received in a hollow waveguide (HW) region (core) between opposing HCG faces which provide lateral confinement in response to glancing reflections of the incident light beam from high refractive index segments of the HCG as it traverses the core. Embodiments are described for planar waveguides (1D) having a planar core between two planar HCGs, as well as 2D waveguides, such as having rectangular segments of the HCG through which light is propagated. Additionally, other configurations of HCG-HW, including those having arbitrary incidence and azimuth, angled HCG segments, propagation in a direction which is transverse, or alternatively parallel, to the segments of the HCG.

22 Claims, 12 Drawing Sheets

U.S. PATENT DOCUMENTS

| | | | |
|---|---|---|---|
| 8,265,435 B2 * | 9/2012 | Fu et al. | 385/37 |
| 8,274,040 B2 * | 9/2012 | Zhong et al. | 250/239 |
| 2003/0044159 A1 | 3/2003 | Anderson et al. | |
| 2012/0093189 A1 * | 4/2012 | Fattal et al. | 372/50.11 |
| 2012/0281950 A1 * | 11/2012 | Fattal et al. | 385/37 |

OTHER PUBLICATIONS

McMullin, J.N. et al.—"Hollow Metallic Waveguides in Silicon V-Grooves"—IEEE Photonics Tech. Letters, vol. 5, No. 9, Sep. 9, 1993, pp. 1080-1082.

Sakurai, Y. et al.—"Control of Group Delay and Chromatic Dispersion in Tunable Hollow Waveguide with Highly Reflective Mirrors"—Japanese Journ. of Applied Physics, vol. 43, No. 8B, 2004, pp. 5828-5831.

Roberts, P.J. et al.—"Ultimate low loss of hollow-core photonic crystal fibres"—Optics Express, vol. 13, No. 1, Jan. 10, 2005, pp. 236-244.

Mateus, C.F.R.—"Ultrabroadband Mirror Using Low-Index Cladded Subwavelength Grating"—IEEE Photonics Tech. Letters, vol. 16, No. 2, Feb. 2004, pp. 518-520.

Huang, M.C.Y. et al.—"A surface-emitting laser incorporating a high-index-contrast subwavelength grating"—Nature Photonics, vol. 1, Feb. 2007, pp. 119-122, plus one page of correction.

Huang, M.C.Y. et al.—"A nanoelectromechanical tunable laser"—Nature Photonics, vol. 2, Mar. 2008, pp. 180-184.

Zhou, Y. et al.—"Tunable VCSEL with ultra-thin high contrast grating for high-speed tuning"—Optics Express, vol. 16, No. 18, Sep. 1, 2008, pp. 14221-14226.

Zhou, Y. et al.—"Surface-normal emission of a high-Q resonator using a subwavelength high-contrast grating"—Optics Express, vol. 16, No. 22, Oct. 27, 2008, pp. 17282-17287.

Karagodsky, V. et al.—"Theoretical analysis of subwavelength high contrast grating reflectors"—Optics Express, vol. 18, No. 16, Aug. 2, 2010, pp. 16973-16988.

Moharam, M.G. et al.—"Rigorous coupled-wave analysis of planar-grating diffraction"—J. Opt. Soc. Am., vol. 71, No. 7, Jul. 1981, pp. 811-818.

Zhou, Y. et al.—"Large Fabrication Tolerance for VCSELs Using High-Contrast Grating"—IEEE Photonics Tech. Letters, vol. 20, No. 6, Mar. 15, 2008, pp. 434-436.

Tsang, H.K. et al.—"Optical dispersion, two-photon absorption and self-phase modulation in silicon waveguides at 1.5 um wavelength"—Applied Physics Letters, vol. 80, No. 3, Jan. 21, 2002, pp. 416-418.

Jackson, K.P. et al.—"Optical Fiber Delay-Line Signal Processing"—IEEE Trans. on Microwave Theory and Techniques, vol. MTT-33, No. 3, Mar. 1985, pp. 193-210.

Song, B. et al.—"Ultra-high-Q photonic double-heterostructure nanocavity"—Nature Materials, vol. 4, Mar. 2005, pp. 207-210.

WIPO, related PCT Application No. PCT/US2009/065840, International Publication No. WO2010/0068476 dated Jun. 17, 2010, including international search report and written opinion issued on Jun. 25, 2010, pp. 1-55.

* cited by examiner

ULTRA-LOW LOSS HOLLOW CORE WAVEGUIDE USING HIGH-CONTRAST GRATINGS

CROSS-REFERENCE TO RELATED APPLICATIONS

This application is a 35 U.S.C. §111(a) continuation of PCT international application number PCT/US2009/065840 filed on Nov. 25, 2009, incorporated herein by reference in its entirety, which in turn claims priority to U.S. provisional patent application Ser. No. 61/117,578 filed on Nov. 25, 2008, incorporated herein by reference in its entirety, and to U.S. provisional patent application Ser. No. 61/143,906 filed on Jan. 12, 2009, incorporated herein by reference in its entirety. Priority is claimed to each of the foregoing applications.

The above-referenced PCT international application was published as PCT International Publication No. WO 2010/068476 on Jun. 10, 2010 and republished on Aug. 19, 2010, and is incorporated herein by reference in its entirety.

This patent application is related to U.S. Pat. No. 7,304,781 which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to waveguides, and more particularly to multiple high contrast gratings configured for constraining light therebetween.

2. Description of Related Art

The ability to guide incident light and generate long optical delays with low intrinsic loss is beneficial within a wide range of applications, including optical signal processors, RF filtering, optical buffers, and optical sensing. Optical fibers have been used for these applications with advantages such as ultra-low loss, dispersion and nonlinearity, and exceedingly large bandwidth. However, optical fibers are bulky, heavy, and lack flexibility for adjustment. In response to this, lithographically defined, chip-scale waveguides have been reported in $SiO_2$/Si and III-V material systems, which are desirable because they are compact, light-weight, and can be integrated with other optoelectronic devices. Yet, the lowest reported loss achieved to date in chip-based waveguides is on the order of 1 dB/m, which is three to four orders of magnitude higher than that exhibited by optical fibers. This loss is unacceptably high for most applications which require 0.01 dB/m, or less. The fundamental reasons for the high losses are direct band-edge absorption, free carrier absorption, and absorption due to interaction with optical phonons. In addition, these devices are expected to have high nonlinearity and dispersion.

Hollow-core waveguides (HW) are highly promising for achieving fiber-like ultra-low loss, nonlinearity and dispersion because of the elimination of the core material. There have been advances in hollow-core waveguides, ranging from waveguides using metallic shells, to ones using distributed Bragg reflectors (DBRs), to ones with photonic crystals (PhCs), and similar approaches. The basic principle is to guide the optical beam propagating through air by multiple reflections at the cladding. One hollow-core PhC optical fiber exhibits an extremely low loss of ~0.001 dB/m; however, the lowest loss for a chip-based hollow-core waveguide is still high, at ~10 dB/m using DBRs. The major loss in these waveguides arises from insufficient reflectivity of the cladding DBR mirrors. Ultrahigh reflectivity is essential to achieve ultra-low loss hollow waveguides.

Accordingly a need exists for a system and method of chip-scale waveguides which provide extremely low losses, but without the need of optical fibers, and more particularly hollow-core fibers. These needs and others are met within the present invention, which overcomes the deficiencies of previously developed waveguide apparatus and methods.

BRIEF SUMMARY OF THE INVENTION

Low loss ($\leq 0.1$ dB/m) optical waveguides are taught which utilize high contrast gratings (HCGs) for light confinement through a hollow core between opposing HCG faces. Each HCG comprises high refractive index segments, surrounded by low index material. Embodiments are described for 1D and 2D HCG hollow waveguides (HW), including a planar waveguide, a rectangular waveguide, a heterostructure waveguide, slanted waveguides, a segmented helical waveguide, and others. Additional aspects include mechanisms for creating waveguides having arbitrary incidence and azimuth, and altered segment orientation. A structure is also disclosed for a HCG-HW structure comprising a coiled waveguide providing a significant length of waveguide in a small form factor and having a large bend radius, in relation the structure sizing, to minimize bending losses. These embodiments can be combined in various ways without departing from the teachings of the present invention.

The invention is amenable to being embodied in a number of ways, including but not limited to the following descriptions.

One embodiment of the invention is an apparatus for guiding light propagation, comprising: (a) a first subwavelength grating layer comprising a first plurality of periodically spaced apart segments of high refractive index material in a grating plane having a selected periodicity between which is disposed low refractive index material; (b) a second subwavelength grating layer comprising a second plurality of periodically spaced apart segments of high refractive index material having a selected periodicity between which is disposed low refractive index material; and (c) a core separating the first and second subwavelength gratings by a predetermined distance which forms a hollow core through which an incident light beam, having a given wavelength, is propagated along a propagation direction. It should be appreciated that the subwavelength grating layers have a period ($\Lambda$) which is no larger than the wavelength ($\lambda$) of the incident light in the medium of the lowest refractive index. The first plurality of high index segments and the second plurality of high index segments are disposed, facing one another on parallel planes on either side of the core. The core is configured for receiving incident light between the first and second subwavelength gratings and providing lateral confinement in response to glancing reflections from grating segments of the first and second subwavelength grating layers as the incident light beam traverses the core. The optical confinement within the core is in response to destructive interference which arises between multiple grating harmonics in a subwavelength periodic structure.

In at least one aspect of the invention the periodicity of the grating segments within the opposing faces of subwavelength gratings is transverse to the propagation direction of the incident light, although embodiments are described at which these segments are at a diagonal or even parallel to the propagation direction depending on the parameters selected for the grating in relation to the properties of the incident light. The incident light beam is bounced between segments of high refractive index material as it travels through the core. Angle of light beam incidence is measured from the plane of the grating determined in response to selection of grating period, thickness and duty cycle for the subwavelength gratings. It should be appreciated that although shown for the sake of simplicity with straight (linear) segments of high index material, embodiments can be implemented having curved lines of high refractive index material. It should also be appreciated that the gratings on either side of the core direct the incident light beam in response to glancing reflectivity, instead of backward wave reflection which would result when using traditional periodic structures. This limited reflection arises in response to the subwavelength structures which only allow propagation of the zeroeth order mode while higher order modes can be made evanescent. In addition, the periodicities and duty cycles of the said first and second subwavelength gratings do not need to be the same.

In at least one embodiment of the invention a box-shaped confinement is provided by third and fourth subwavelength grating layers of periodically spaced apart segments of high refractive index material having a selected periodicity between which is disposed low refractive index material. The third and fourth subwavelength grating layers face one another on parallel planes which are perpendicular to, and disposed between, first and second subwavelength gratings and on either side of the core. The periodicities and duty cycles of the third and fourth subwavelength grating do not need to be equal to each other or those of the said first and second subwavelength gratings.

In at least one embodiment of the invention a heterostructure HCG and/or heterostructure hybrid HCG is taught in which at least one portion of the first and/or second plurality of periodically spaced apart segments of high refractive index material, extending along a propagation direction between the first and second subwavelength grating, have a different periodicity. In the heterostructure HCG waveguide all the HCGs have an identical region with different periodicity, while within the hybrid they may have any number of the HCGs with altered periodicity.

In at least one aspect of the invention the light beam incidence angle is measured from a plane of the grating and is determined in response to selection of grating period, thickness and duty cycle.

In at least one embodiment of the invention a rectangular core having perpendicular or slanted rectangles, or other geometric shapes (e.g., quadrilateral plane figure, hexagonal cross section, octagonal cross section, and so forth, having opposing parallel HCG faces, is described. In one embodiment a rectangular plane figure extends in the propagation direction of light, with the rectangles formed from a segment in each of four HCGs which border the hollow core. The segments can be oriented perpendicular to the propagation direction or positioned at a diagonal, or interconnected in a segmented helical or spiral arrangement.

In at least one embodiment the waveguide is configured in a spiral coil. The waveguide has a plurality of subwavelength grating layers as segments of high refractive index material having a selected orientation and periodicity with a core disposed between opposing faces of the HCG. Portions of a single waveguide are considered as a first elongate section, a second elongate section and a transition section. The first and second elongate sections are disposed parallel to one another following a circular path in a spiral pattern. The first section transitions to the second section within the interior of the spiral pattern forming an S-shaped transition which has a bending radius of approximately one-half of the minimum radius found within the interior of the spiral pattern.

The present invention provides a number of beneficial aspects which can be implemented either separately or in any desired combination without departing from the present teachings.

An aspect of the invention is a hollow waveguide exhibiting extremely low losses, such as 0.006 dB/m.

Another aspect of the invention is a hollow waveguide utilizing 1D or 2D high contrast gratings of periodically spaced apart segments of high refractive index material surrounded by low index material.

Another aspect of the invention is a 1D HCG waveguide structure having a hollow core defined in the space between two gratings, and through which the light is propagated.

Another aspect of the invention is a hollow waveguide structure with HCG segments comprising linear or curved segments of high refractive index material.

Another aspect of the invention is a hollow waveguide structure configured for light propagation parallel to or perpendicular to the segments of high index material in the grating depending on the selected characteristics of the segments and the light polarization.

Another aspect of the invention is a waveguide through which the light is propagated in response to glancing reflections between high refractive index segments of the HCG.

Another aspect of the invention is a hollow waveguide which provides confinement within the core in response to destructive interference between multiple grating harmonics.

Another aspect of the invention is a hollow waveguide structure which is configured to allow propagation of incident light having arbitrary incidence and azimuth in relation to the plane of the segments.

Another aspect of the invention is a hollow waveguide structure having angle of incidence ($\theta$) with respect to the plane of the HCGs determined in response to period ($\Lambda$), thickness ($t_g$) and duty cycle ($\eta$).

Another aspect of the invention is a hollow waveguide structure having a plurality of rectangular segments of high index material separated by low index material.

Another aspect of the invention is a hollow waveguide structure having a plurality of rectangular segments of high index material separated by low index material.

Another aspect of the invention is a hollow waveguide structure in which the segments of high index material are slanted at a diagonal.

Another aspect of the invention is a hollow waveguide structure in which at least one portion of at least one of the HCGs is configured with different structural characteristics (e.g., period and/or thickness) than the surrounding portions.

Another aspect of the invention is a hollow waveguide structure in which rectangular segments are disposed at an angle from the propagation direction.

Another aspect of the invention is a hollow waveguide structure in which rectangular segments are linked in a segmented spiral surrounding a hollow core region.

Another aspect of the invention is a hollow waveguide using high contrast grating which are subwavelength and thus have a period ($\Lambda$) which is no larger than the wavelength of the incident light.

A still further aspect of the invention is a coiled configuration of an HCG hollow waveguide providing a large delay within a compact size.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 3 through FIG. 20. It will be appreciated that the apparatus may vary as to configuration and as to details of the parts, and that the method may vary as to the specific steps and sequence, without departing from the basic concepts as disclosed herein.

1. Introduction to High Contrast Gratings.

Novel very high contrast grating (HCG) structures exhibiting broadband reflectivity for surface-normal incident light have been described by the Applicants, such as in U.S. Pat. No. 7,304,781. Embodiments of these HCG structures have been taught as the top mirror of a vertical cavity surface emitting laser (VCSEL) as well as utilized as a high-Q resonator.

The present invention utilizes the beneficial aspects of these HCGs in presenting novel ultra-low loss hollow-core waveguide structures that are optimized to reflect light at glancing angles between the high reflectivity gratings of the present invention.

Figure 1:
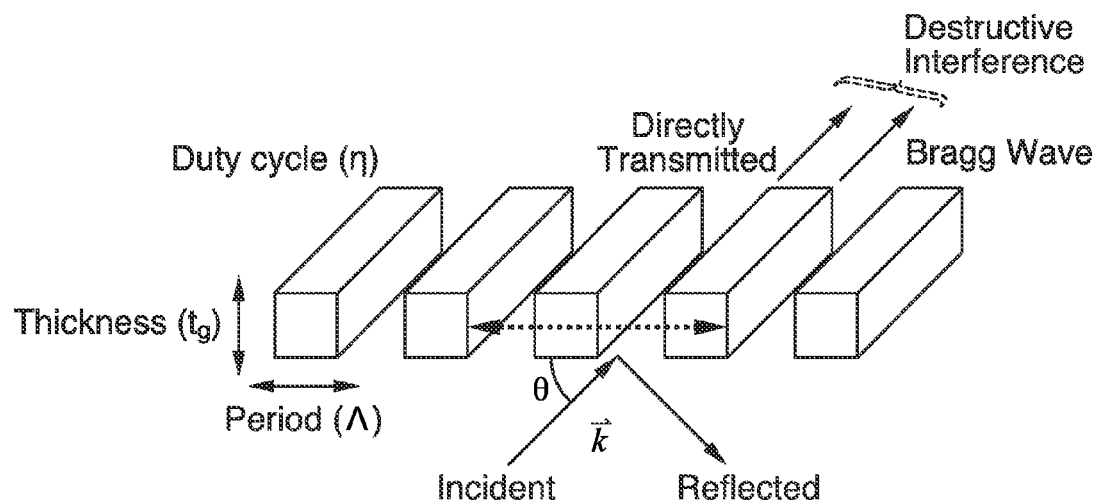
FIG. 1 is a schematic of a high contrast grating (HCG), showing segments of high index material surrounded by a low index material as utilized according to aspects of the present invention.

FIG. 1 illustrates an example embodiment of a High Contrast Grating (HCG), showing segments (bars) of high index material which is surrounded by low index material. These subwavelength gratings have a period ($\Lambda$) (lambda), which is less than or equal to the wavelength of the incident light of interest (that being propagated by the waveguide). The incident angle ($\theta$) (Theta) of the light to the grating is measured from the plane of the grating. High reflectivity in a subwavelength grating can be achieved by proper choice of grating parameters.

The HCG gratings are typically fabricated from semiconductors and have a high refractive index, such as greater than three. In general, there exist three physical parameters which control grating reflectivity: period ($\Lambda$), thickness ($t_g$), and duty cycle ($\eta$) (eta). Duty cycle is defined as the ratio of the width of the high index material to the periodicity ($\Lambda$). The incident angle of the light ($\theta$) is measured from the plane of the grating. When a light beam is incident on a periodic grating, the light is reflected and transmitted into multiple diffraction orders. However, when the period of the grating is less than or equal to the wavelength ($\Lambda<\lambda$), all higher order modes are evanescent except the zeroeth-order mode. When the grating parameters are optimally designed, destructive interference between the directly transmitted wave and the Bragg transmitted wave leads to extremely high reflectivity. Broadband high reflectivity is possible in response to the high index contrast between the gratings and their surroundings.

Other options to provide a broad bandwidth reflectivity include the use of metallic mirrors, distributed Bragg reflectors (DBRs), and photonic crystals (PhCs). At optical frequencies, metallic mirrors suffer high losses and their peak reflectivity is too low for many applications. Dielectric mirrors, such as DBRs and PhC, can be designed with near unity reflectivity at a single wavelength. However, most applications require that the reflector provide high reflectivity across a band of wavelengths.

Figure 2:
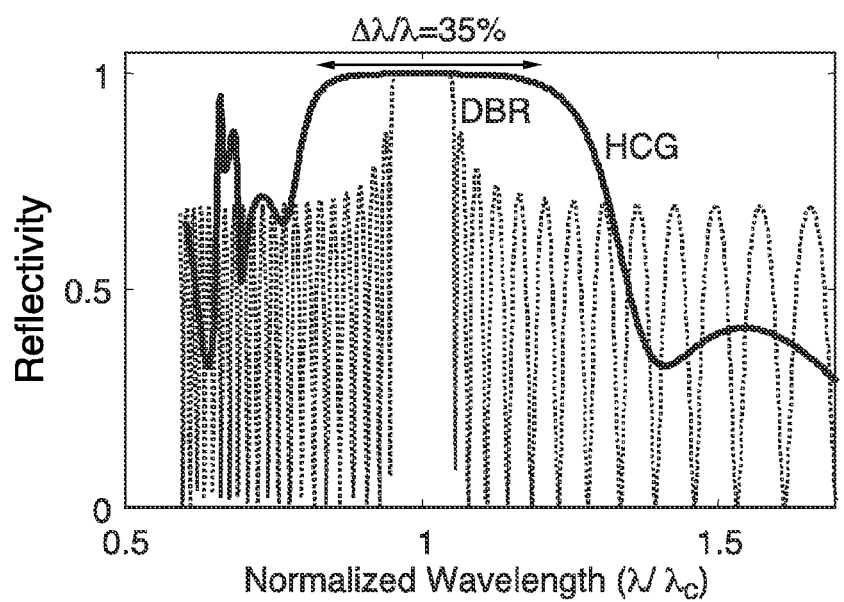
FIG. 2 is a graph of reflectivity spectrum for a DBR in comparison with an HCG utilized according to aspects of the present invention.

FIG. 2 depicts a comparison between the reflectivity spectrum of HCG in the wideband solid line, compared with the response of a typical distributed Bragg Reflector (DBR). It should be appreciated that although both the example devices were designed for wide bandwidth, the DBR response varies widely across the bandwidth range. It can be seen that the reflection bandwidth of the HCG significantly exceeds that of the DBR.

The most significant distinction of HCG from DBRs or photonic crystal is that in the latter, the reflectivity results from constructive interference of reflection from multiple, distributed layers (interfaces). This and other distinctions lead to several advantages in an HCG-based reflector, including small thickness, polarization selectivity and a broad reflection bandwidth. In particular, HCGs may be used to create a novel, high-performance hollow waveguide, as will be discussed in the following section.

2. Hollow Wavequide.

Figure 3:
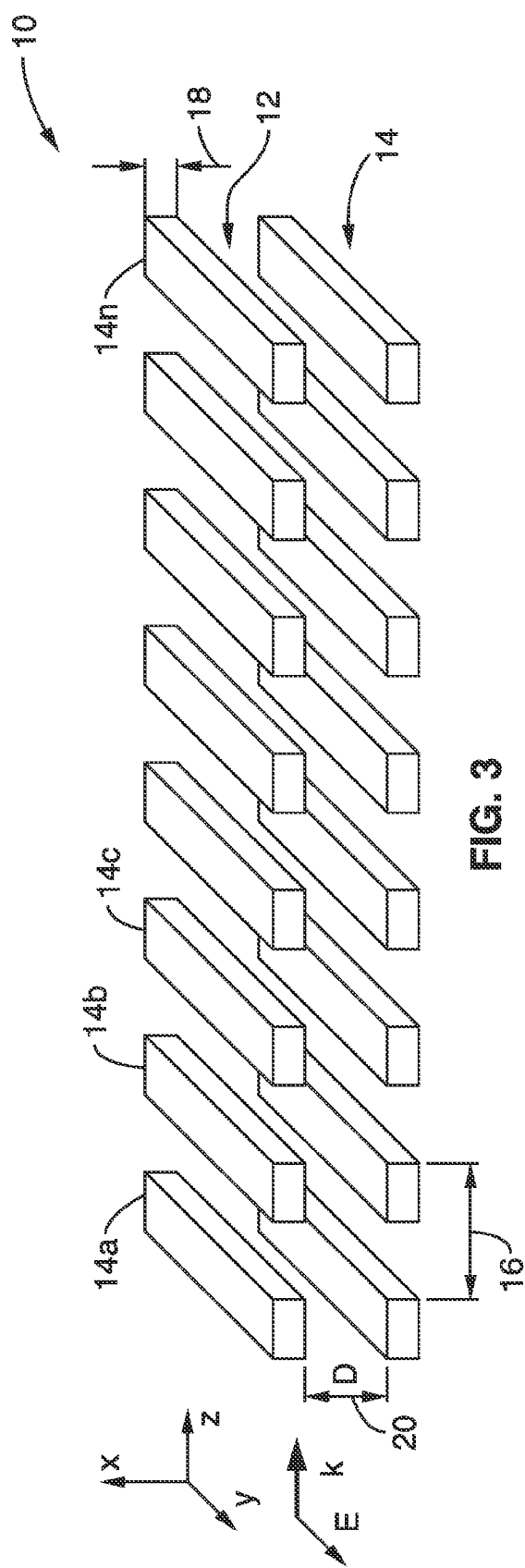
FIG. 3 is a schematic of a one-dimensional high contrast grating (HCG) hollow waveguide (HW) fabricated according to an embodiment of the present invention.

FIG. 3 illustrates an example embodiment 10 of a one-dimensional high contrast grating (1D HCG) hollow-core slab waveguide structure consisting of a first reflecting HCG 12 and a second reflecting HCG 14 on parallel planes facing one another. High refractive index segments 14a, 14b, 14c, ... 14n are depicted with period 16 and each having thickness 18. The segments 14 have the same orientation and periodicity, with the first and second HCG separated by a distance (D) 20. The high refractive index segments can be considered infinite in the y directions, and periodic in the z direction which is the direction of light propagation as constrained between HCG 12 and 14. In the following example, the incident light is directed along the z axis having TE polarization in which the electric field is parallel with the grating fingers.

Figure 4:
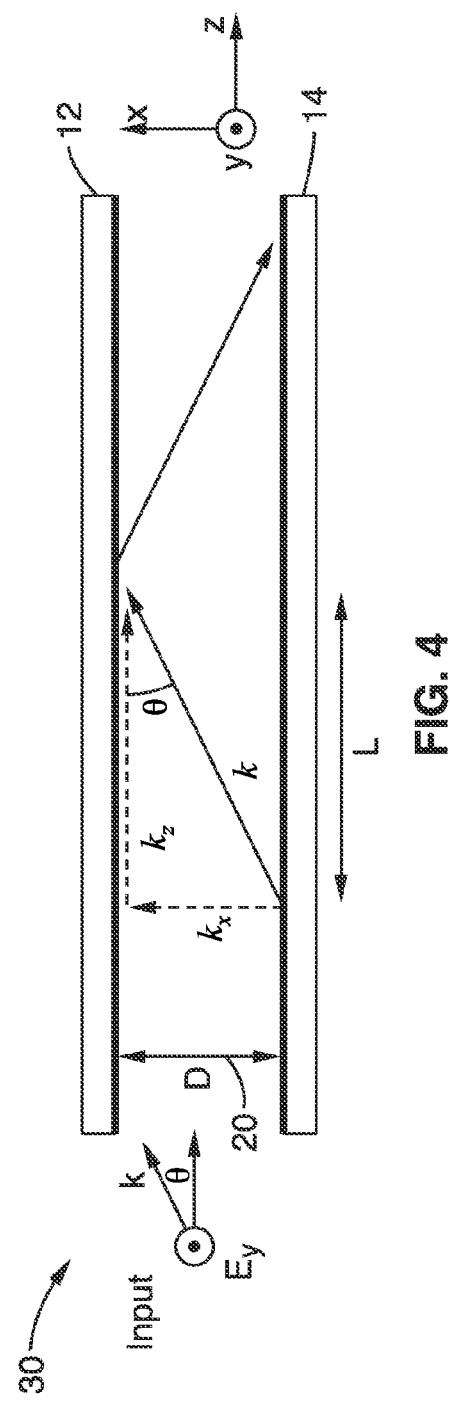
FIG. 4 is a ray-optics model for propagation through the hollow core slab waveguide according to an aspect of the present invention.

FIG. 4 illustrates a ray optics model 30 for guided mode in a hollow-core slab waveguide to demonstrate the potential of this structure for low-loss guiding. The optical fields in the core of the waveguide can be expanded into a series of plane waves bouncing between the reflecting HCG planes at different angles. Two reflective surfaces 12, 14 extend infinitely in the y-z plane with light propagating in the z direction. The spacing (D) 20 between the two planes forms the core of the waveguide. Light within the core can be expressed as a plane wave expansion, where the plane waves within the core are characterized by the wave vector k.

Due to the high reflectivity of the HCG, the simple ray-optics model may be used for estimating propagation properties. A ray which propagates through a hollow-core waveguide (HW) of size (D) 20 at an incident angle ($\theta$) (theta) travels a distance D/tan $\theta$ per bounce. At each bounce, there is a loss $\delta$ (delta) of $\delta=1-R$, where R is the reflectivity of the HCG at angle $\theta$. Assuming there is no material loss in the hollow waveguide core (air), the optical propagation loss per unit length over distance L is given by:

$$\alpha(dB/m) = -\frac{10}{L}\log\left(\frac{P_t}{P_i}\right) \quad (1)$$

$$= -\frac{10}{L}\log(R^N)$$

$$= -\frac{10}{L}N\log(R)$$

$$= -10\frac{\tan\theta}{D}\log(R)$$

where N is the number of bounces in distance L and N=L tan $\theta$/D.

For a propagating mode, the round-trip phase shift incurred by the wave from crossing the waveguide in the transverse direction is a multiple of $2\pi$. A discrete set of angles satisfies this condition and forms the modes of the waveguide. Provided that there is no significant phase shift associated with the reflections, the modal angles are given by:

$$k_x D = \frac{2\pi}{\lambda}\sin\theta \cdot D = m\pi; \quad m = 1, 2, \ldots, n \quad (2)$$

Thus, the modes of a HW are determined only by D. Each mode can be described in terms of its characteristic angle $\theta$. For small $\theta$ and large D, $\theta \approx \sin\theta = m\lambda/2D$ and the propagating loss is inversely proportional to the square of D.

The ray optics approach presented above may be compared against a rigorous analytic formulation for propagating modes in the waveguide. Such an analysis is based on exact solutions to Maxwell's equations written separately for the three regions of the waveguide: the core (x>D/2), the grating region (D/2<x<D/2+$t_g$) and outside the grating (x>D/2+$t_g$). By matching the boundary conditions at the interface, a set of homogeneous equations is arrived at which relates the field amplitudes in each region. Axial propagation constant and the mode profiles can be solved by looking for solutions when the determinant of the homogeneous system becomes zero. Comparison between these solutions and those obtained by the simpler ray optics formulism show excellent agreement.

In the preceding example, HCGs with periodicity parallel to the direction of propagation can confine light in the waveguide. Instead of causing the backward wave reflection normally expected from traditional periodic structures, the HCGs form a high reflectivity glancing incidence mirror for the guided wave. At first thought, this structure may seem quite similar to a photonic crystal slab waveguide (PhC-SW), but having only one crystal period in each direction. However, the guidance principle in an HCG waveguide is significantly different and distinct than that of a traditional PhC-SW. It should be appreciated that the light in a PhC-SW is confined to the core due to the photonic band gap arising from constructive interference of distributed reflections from each periodic layer surrounding the core. In fact, the concept of photonic bandgap stems from the distributed reflections from multiple layers, whereby a single layer can never provide sufficient reflection for guidance. In the case of a high-contrast grating hollow core waveguide, the confinement is provided in response to the destructive interference of multiple grating harmonics in a subwavelength periodic structure. It should be appreciated that utilizing propagation parallel to the direction of periodicity of a periodic structure using a single layer of HCG on each side to provide lateral confinement as taught herein was a previously unexplored concept in guided-wave optics.

Figure 5:
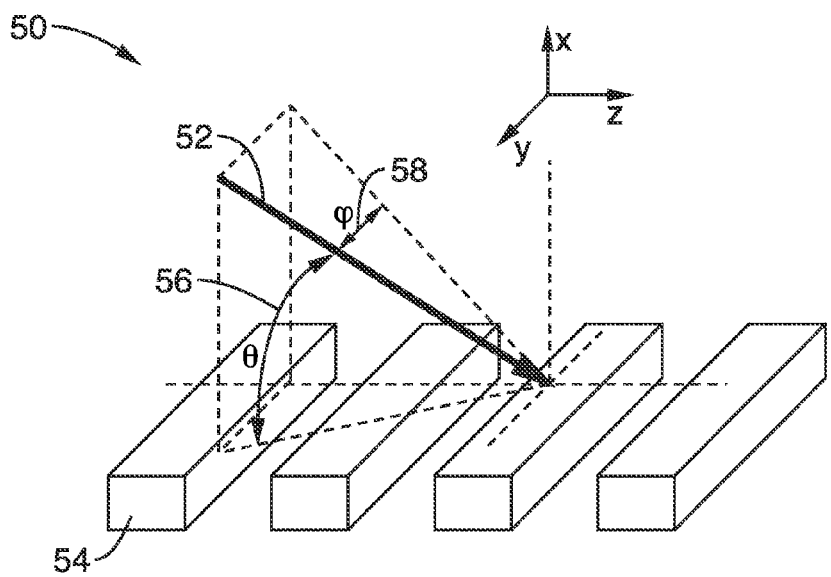
FIG. 5 is a schematic of an HCG depicting arbitrary angle of incidence and azimuth as utilized according to an aspect of the present invention.

FIG. 5 illustrates an example embodiment 50 of light 52 incident on an HCG, having segments 54, and arbitrary angle of incidence $\theta$ 56 and azimuth $\phi$ (phi) 58. It will be appreciated that for the sake of simplicity of illustration, a single HCG is shown instead of two opposing layers needed for the waveguide. The present invention allows the HCGs to be configured for operation at arbitrary azimuth $\phi$, as shown in the figure, in response to selecting proper parameters for period ($\Lambda$), thickness ($t_g$) and duty cycle ($\eta$).

Figure 6:
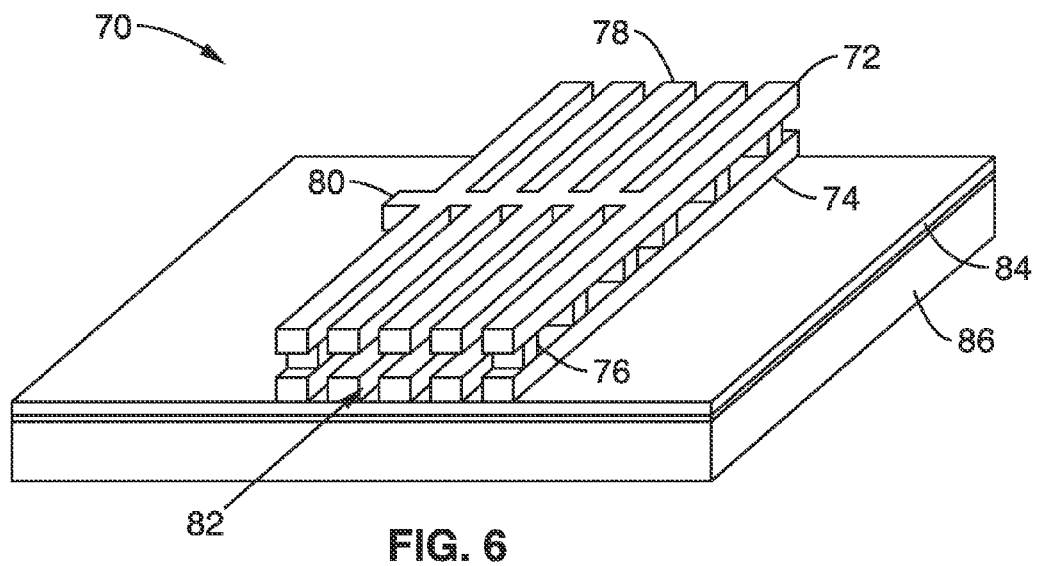
FIG. 6 is a schematic of an 1D HCG-HW with grating segments parallel to the propagation direction according to an aspect of the present invention.

FIG. 6 illustrates an example embodiment 70 of an HCG-HW with HCG periodicity being transverse to the propagation direction, which it should be recognized is perpendicular to that described in FIG. 3-4. First and second HCG layers 72, 74 are shown separated by spacers 76 creating a hollow core between the HCGs. Segments 78 are oriented parallel to the propagation direction 82, and shown by way of example coupled to a mechanical support 80. The HCG structure is shown fabricated over a low index material 84 upon a substrate 86.

As before, light is TE-polarized with respect to the waveguide, but in this case is TM polarized with respect to the cladding gratings, whereby the fields are perpendicular to the grating elements and ϕ=90°. It should also be appreciated that the present invention can be implemented with other combinations as well, such as using an HCG-HW to guide light which is TM-polarized with respect to the waveguide and TE-polarized with respect to the grating, or TM-polarized with respect to both. Additionally, an intermediate value of ϕ may be chosen, allowing the HCG gratings to be oriented diagonally in relation to the direction of propagation.

Figure 7:
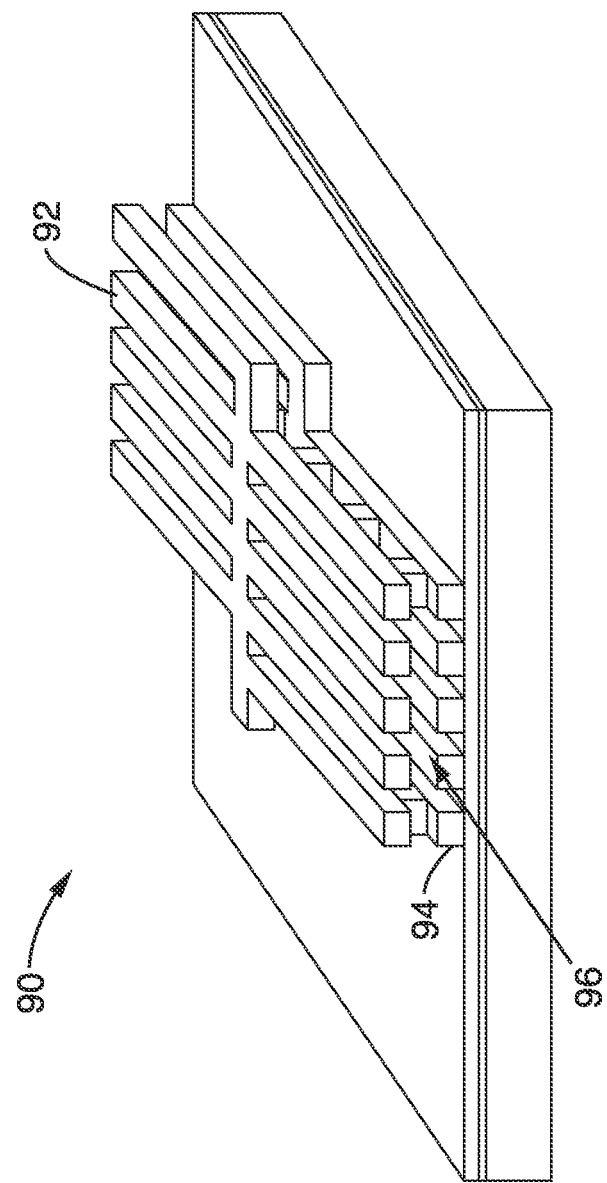
FIG. 7 is a schematic of an 1D HCG-HW with grating segments having a diagonal slant from the propagation direction according to an aspect of the present invention.

FIG. 7 illustrates an example embodiment 90 when choosing an intermediate value of ϕ, and showing first HCG 92 and second HCG 94 canted on a slight diagonal in relation to propagation direction 96. It should be appreciated that the teachings of the present invention can support diagonal positioning of the segments to any desired angle.

3. Design and Evaluation.

Use of the ray optics formulism requires the reflectivity of a given HCG design as a function of wavelength λ, and incident angle. For the example presented here, this information is obtained by rigorous coupled wave analysis (RCWA), after which loss is calculated using Eq. (1).

Figure 8A:
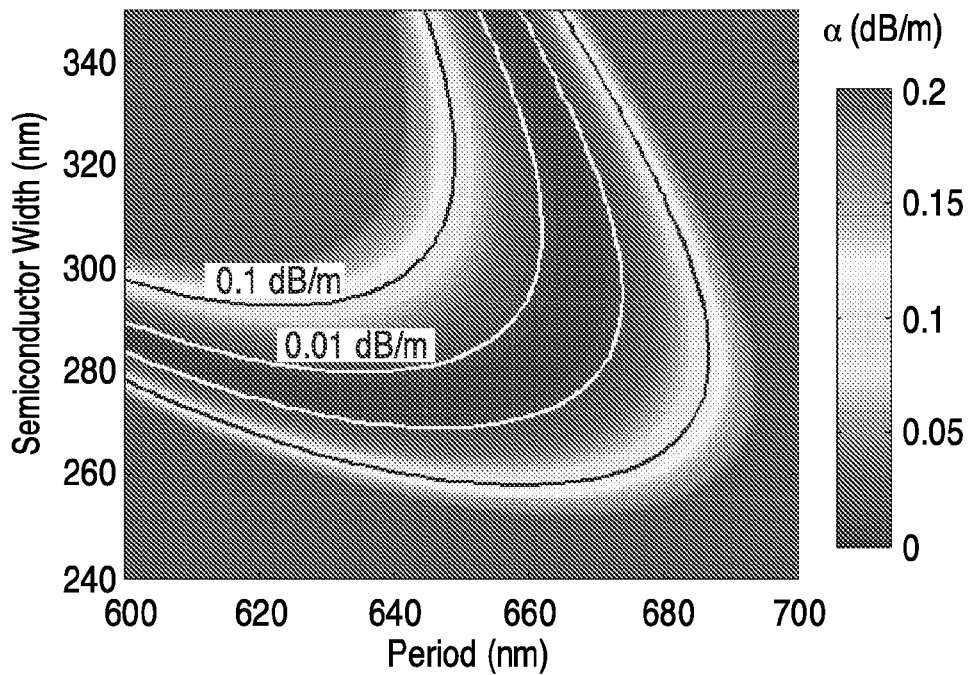
FIG. 8A-8C are graphs of simulated HCG-HW performance according to an aspect of the present invention.
Figure 8B:
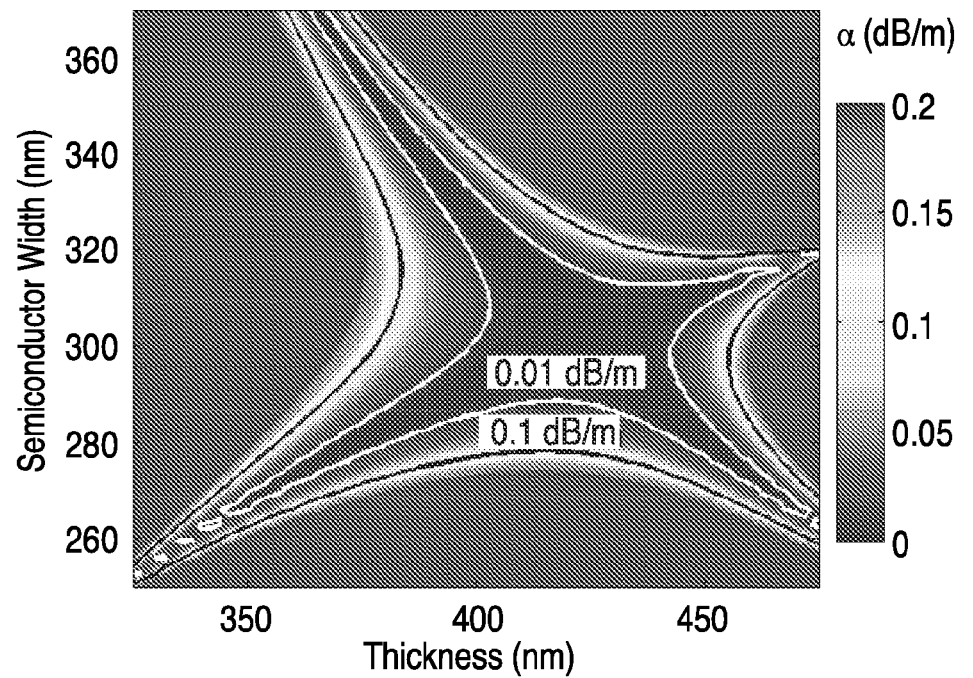
Figure 8C:
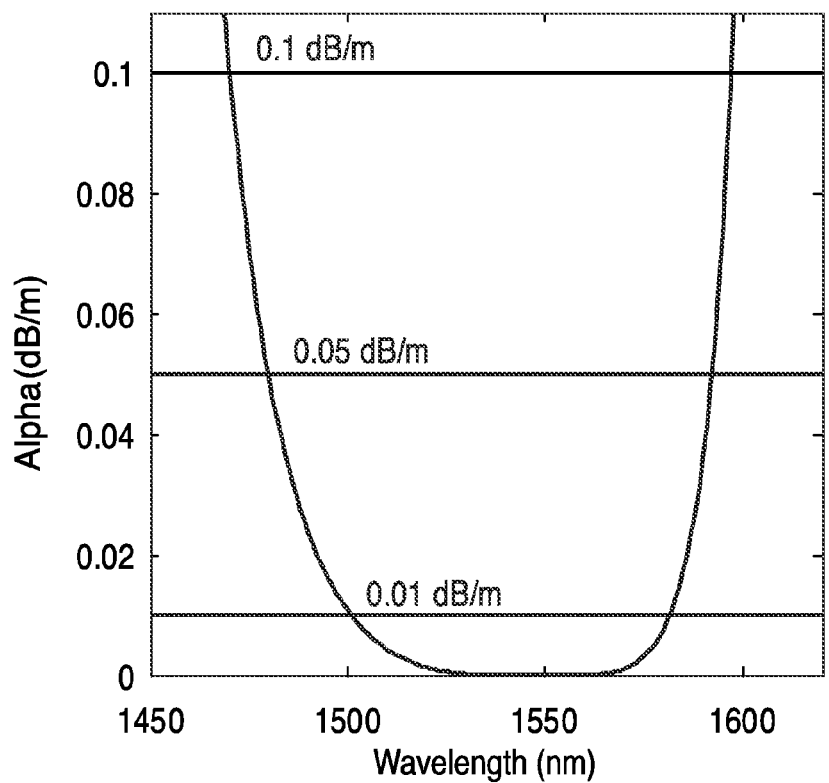

FIG. 8A-8C depict calculations in graphical form for waveguide loss α (alpha) (dB/m) at 1.55 μm for a 15 μm core slab HCG-HW as a function of grating period and semiconductor width in the contour plot of FIG. 8A, thickness and semiconductor width in FIG. 8B, and wavelength in FIG. 8C with 0.1 dB/m and 0.01 dB/m lines shown labeled in the plots.

With HCG period Λ and index η the loss s=Λ·η. The waveguide core size D is fixed at 15 μm (corresponding to θ=3°) at λ=1.55 μm with $t_g$ fixed at 410 nm. The loss of 0.1 dB/m and 0.01 dB/m are shown by the black and white contours, respectively. FIG. 8B shows loss contour plot in relation to $t_g$ and s for the case when Λ is fixed at 665 nm Once again the loss of 0.1 dB/m and 0.01 dB/m are shown by the black and white contours, respectively. These figures illustrate that a practical variation tolerance is obtained to accommodate fabrication imperfections.

One important aspect of HCG is the ability to design a large spectral width despite the stringent reflectivity requirement. By way of example and not limitation, the following grating parameters were used in achieving a broad spectral width: Λ=730 nm, $t_g$=1.04 μm, η=65%, high index grating η=3.6 and low index air η=1. It will be seen in FIG. 8C the fundamental mode propagation loss for a 15 μm core HCG-HW as a function of wavelength. By way of example, large spectral widths of 130 nm and 80 nm can be achieved for loss requirements of 0.1 dB/m and 0.01 dB/m, respectively.

As the HW loss is inversely proportional to $D^2$, it is desirable to design a large core waveguide. However, a large D leads to a large number of modes, which may be detrimental. The HCG-HW offers a unique advantage as it simultaneously has a large core while maintaining a single polarization and transverse mode. This is because of the angular and polarization dependence of the HCG reflectivity, thus HCGs can be designed to yield higher loss for larger σ, i.e. higher order modes, such that they are preferentially filtered out.

Figure 9:
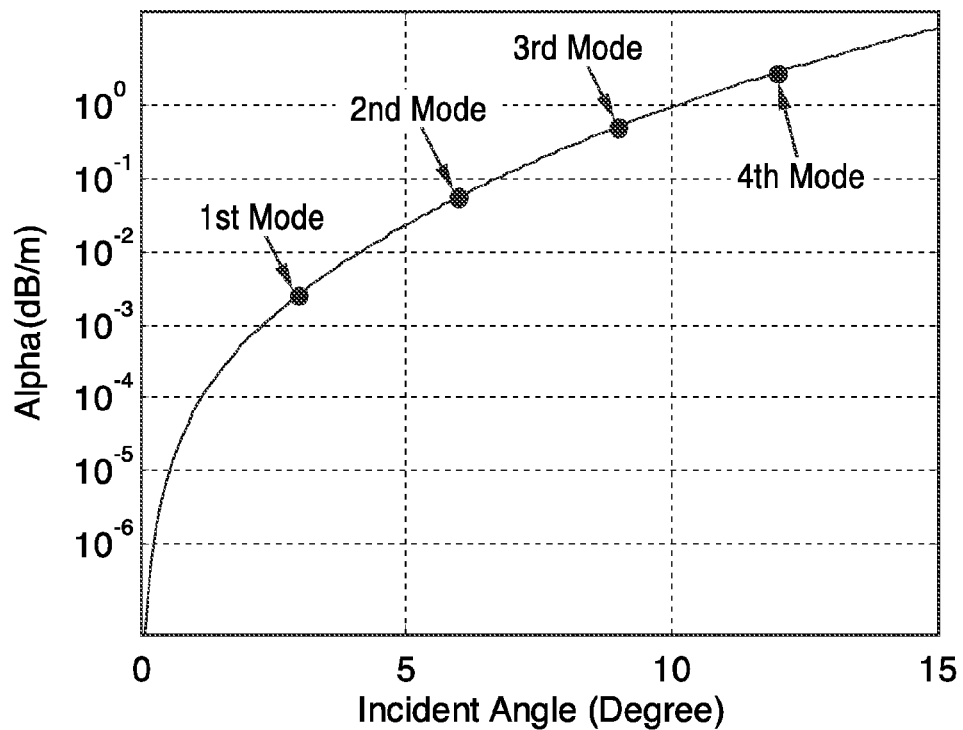
FIG. 9 is a graph of modes in relation to incident angle for the HCG-HW according to an aspect of the present invention.

FIG. 9 depicts α with respect to incident angle θ for D=15 μm, with the first four modes marked on the curve. Propagation loss of a 1D slab HCG-HW with respect to θ for the first four TE modes in a 15 μm HCG-HW. Symmetry of the inventive configuration prevents the structure from launching into a second order mode. Consequently, the difference between the first and third order modes is an important factor for modal screening. In this case, the losses for a $3^{rd}$ mode ($2^{nd}$ lowest odd order mode) is drastically higher than that of the $1^{st}$ mode. In one case the losses for the $3^{rd}$ mode were observed at 200 times higher than that of the $1^{st}$ mode.

The loss for the fundamental mode was found as low as 0.0026 dB/m. The $2^{nd}$ order mode loss is also rather low at 0.057 dB/m. However, choosing launching conditions with symmetric transverse field components would excite only the odd order modes, so that the next mode is the $3^{rd}$ mode, whose loss is 200 times higher than that of the $1^{st}$ mode. With this angular loss dependence, HCG-HW can simultaneously achieve low loss for the fundamental mode and high suppression towards higher-order modes. It should be recognized that mode selectivity is a design decision that may be increased with corresponding trade-offs, such as with loss or bandwidth.

4. Confinement.

An important advantage which the HCG-HW maintains over all rival implementations is a high concentration of optical energy within the hollow core and a correspondingly small concentration of energy in the optical cladding. While other highly reflective structures, such as DBR or PhC, require multiple layers to achieve high reflectivity, the HCG structure achieves a significantly higher level of light confinement using a single layer of cladding comprising the grating. Because of this, the field penetration depth in HCG-HW cladding is significantly reduced when compared to DBR or PhC based HW. Two of the specific advantages offered by the high confinement of the HCG-HW is reduced scattering losses and reduced optical nonlinearity.

Figure 10:
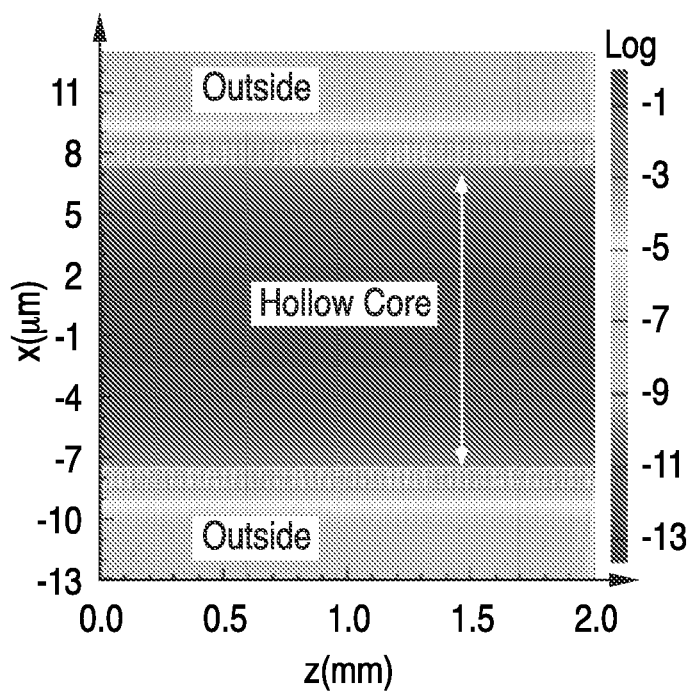
FIG. 10 is a graph of simulated electric field intensity of an HCG-HW according to an aspect of the present invention.

FIG. 10 depicts a simulated electric field intensity profile of HCG-HW having a 15 μm core size, by way of example and not limitation, shaded in response to a logarithmic scale. The simulation was performed using finite-difference time-domain (FDTD) numerical simulation, which can be utilized for calculating optical fields in the core, cladding, and outside of the HCG-HW. The field intensity outside the HCG-HW is only a factor of $10^{-8}$ portion of the intensity at the center of the hollow core. In this simulation, TE-polarized light with a mode profile matching the fundamental mode is launched (incident the core) into a 2 mm long HCG-HW. The spectral width of the launched light was modeled as approximately 4 nm. As shown in the figure the light was guided inside the hollow core, and the field intensity outside the HCG-HW was found in the simulation to be $10^8$ times lower than that at the center of the hollow core, which agrees with the σ≈$10^{-8}$ result obtained using RCWA.

Figure 11:
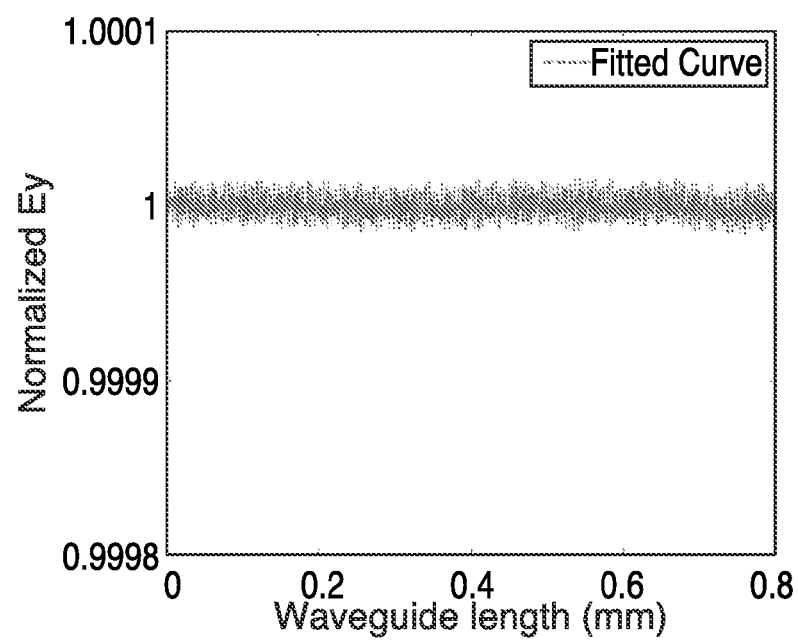
FIG. 11 is a graph of simulated electric field intensity for an HCG-HW according to an aspect of the present invention.

FIG. 11 depicts a normalized 2D electric field intensity profile along the propagation direction in the center of an HCG-HW with a 15 μm core size as a function of waveguide length. Linear regression is used to fit the curve as plotted in the dashed-line fitted curve. A waveguide propagation loss of 0.006±0.0024 dB/m is obtained with 95% fitting the confidence bounds. The figure further quantifies the extremely low leakage of optical power by plotting the normalized $E_y$ intensity at the center of the hollow core as a function of propagation distance z over a 0.8 mm section located halfway along the waveguide. A waveguide propagation loss of 0.006±0.0024 dB/m with 95% fitting confidence bounds is obtained from a fit to this data.

Referring again to FIG. 10 the field intensity inside the grating, between the segments, was also found to be very low, on the order of $10^{-4}$ to $10^{-3}$ of the intensity which should exist at the center of the waveguide core. Using the field profile data from FDTD simulation, the total field energy inside the hollow-core as well as the total energy inside the HCG cladding layer was integrated. The result obtained in FIG. 10 indicates that the energy inside HCG layers is only $10^{-7}$ to $10^{-6}$ of the total energy inside the waveguide core, and as such is a much lower fraction than exists in other HW claddings.

5. Scattering Losses.

For a fabricated waveguide structure, it has been long recognized that the scattering loss from interference roughness and fabrication imperfection can degrade the waveguide performance and introduce scattering loss. Scattering loss is can be estimated using a Rayleigh scattering cross-section as $\alpha(dB/m)=4.3(S_{inc}/P_{tot})\sigma_R\rho_S$, where $S_{inc}$ is the incident Pointing vector at the vicinity of the scattering centers, $P_{tot}$ is the total power carried through the waveguide and $\rho_s$ is the surface density of the scattering centers, and $\sigma_R$ is the Rayleigh scattering cross-section. The scattering loss for HCG-HW is expected to be very low because the power near and inside the reflecting HCG is almost zero (only $10^{-7}$ to $10^{-6}$ of the total power), which means that $S_{inc}$ is extremely small. In addition, the small penetration depth of HCG also provides less opportunity for scattering centers on the HCG surface to interact with the field, which additionally leads to lowered scattering loss. In previous studies by the inventors on HCGs with surface normal incident angle it was found that HCG structures can be extremely robust in tolerating fabrication imperfection.

6. Optical Nonlinearity.

For data communication, nonlinearity can severely degrade signals in both analog and digital system-level applications of low loss waveguides. HCG-HW can significantly reduce nonlinear effects in data transmission, since the optical power is tightly confined in "linear" air, which means that a very small fraction of the optical field interacts with the grating material. From FDTD simulation results, the field intensity located in the high-index solid region should be only about $10^{-7}$ to $10^{-6}$ of the intensity found in the core of the waveguide. Therefore, it is estimated that the overall reduction in the effective nonlinear coefficient per unit length is ~$10^6$ to $10^7$ lower than in regular silicon waveguides, which means the HCG-HW can handle higher power over a longer distance, thereby dramatically increasing overall system performance.

7. Temperature Stability.

For optical delay lines using conventional waveguides, temperature variations cause index changes which lead to degradation of delay phase precision. By contrast to this, the meager optical field penetration into the HCG of only $10^{-7}$ to $10^{-6}$, indicates that the HCG-HW will be highly robust in regards to handling temperature variation. Assuming a typical index change coefficient of $10^{-4}$ per degree in the semiconductor part of HCG, the change of group velocity can be calculated based on the analytical formulation. The result shows that a change of 80° C. over 150 m would translate into a 50 fs time delay precision or 0.05% of $2\pi$ in phase shift for a 10 GHz signal, which provides an extremely high $10^{-8}/°$ C. total phase delay precision. This resilience against heat-induced changes in guiding characteristics demonstrates the usefulness of HCG-WG as a means of guiding very high intensity optical power.

8. Dispersion.

The dispersion of a waveguide consists of material dispersion and waveguide dispersion. For a chip-scale silicon waveguide, the dispersion is dominated by the material dispersion, which is as high as 1000 ps/ns/km.

However, for HCG-HW structures of the present invention, from the FDTD simulation result, the field intensity located in the high-index silicon region is only $10^{-7}$ to $10^{-6}$ of the intensity in the core of the waveguide. Therefore, the material dispersion contribution is less than $10^{-3}$ ps/ns/km, which can be ignored. The dispersion relationship of the HCG-HW can be calculated by ray optics as well as our analytical solution. For the fundamental mode in a HCG-HW with D=15 μm at 1.55 μm dispersion parameter d is obtained of 5.8 ps/ns/km using ray optics estimation and 8.2 ps/ns/km using the analytical solution. This dispersion number indicates that the proposed HCG-HW can support a >2 THz RF modulation over a length of 5 m.

Additional complications arise with guiding ultrafast, femtosecond and sub-femtosecond optical pulses. The high peak power of such pulses causes non-linear dispersion, which cannot be corrected by standard dispersion compensation techniques. However, HCG-WG dispersion is expected to be nearly perfectly linear, and hence it may be managed in a straightforward fashion, due to the low potential for non-linear interaction as discussed previously.

9. 2D Confinement.

Figure 12:
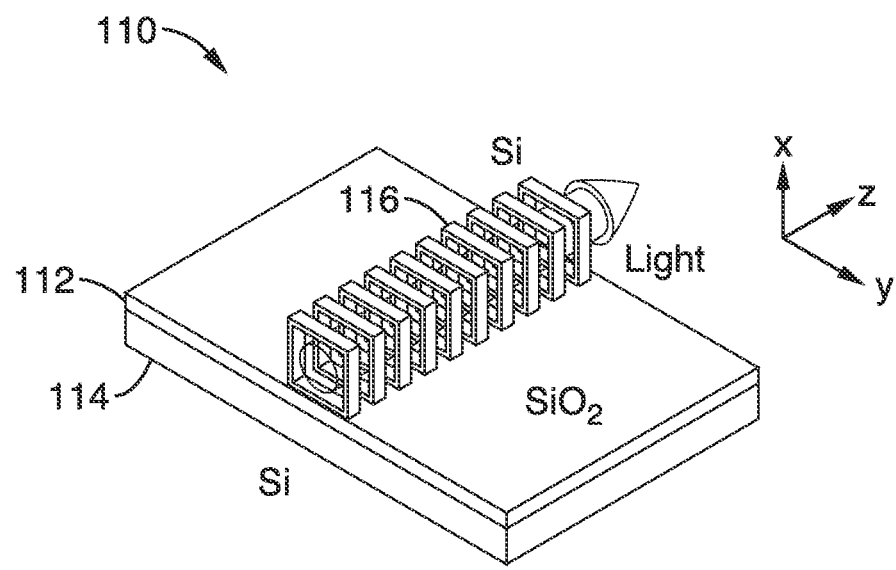
FIG. 12 is a schematic of a hollow waveguide formed from 2D HCG having rectangular segments of high index material surrounded by low index material according to an aspect of the present invention.

FIG. 12 illustrates an example embodiment 110 of a 2D rectangular HCG-HW implemented using a rectangular waveguide structure. The high refractive index segments from FIG. 3 are now enclosed on the sides by using these high refractive index rectangles 116, shown by way of example fabricated on a low refractive index layer 112 (e.g., SiO$_2$) over substrate 114 (e.g., Si). Light is shown propagating through the rectangular HCG-HW in the z direction confined within the interior of the rectangular waveguide structure.

Figure 13:
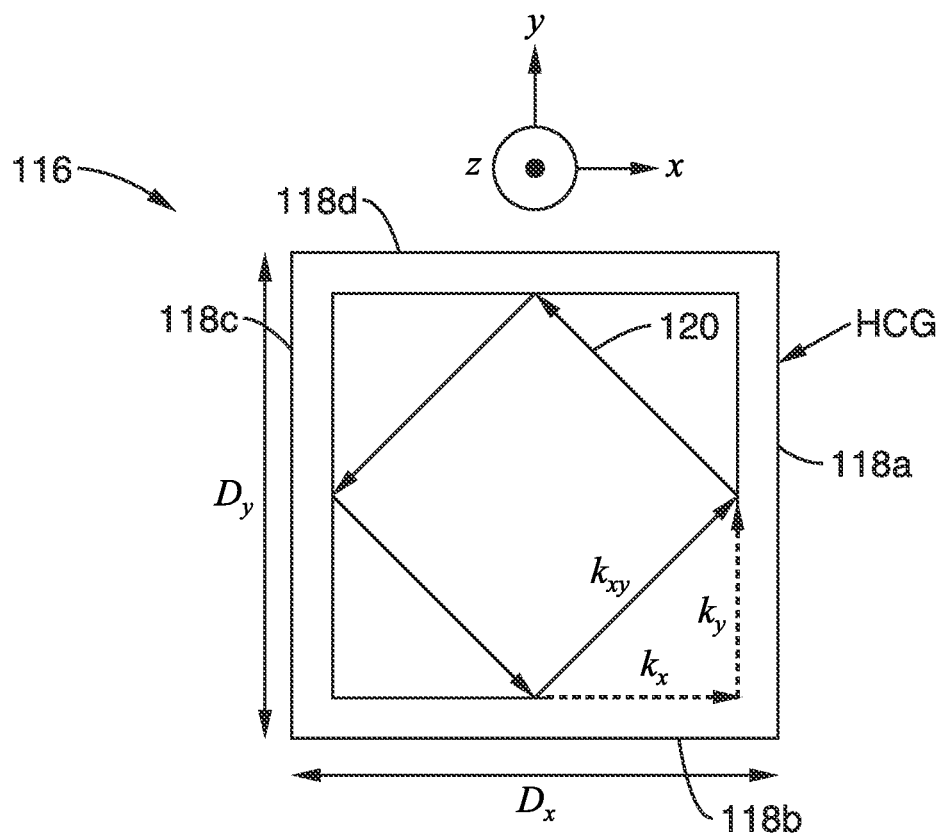
FIG. 13 is a ray-optics model for propagation through the rectangular slab waveguide according to an aspect of the present invention.

FIG. 13 depicts round trip ray tracing at the rectangular HCG-HW structure of FIG. 12, looking along the z axis direction. The sizes of the hollow-core in x and y direction are $D_X$ and $D_y$, respectively. It should be appreciated that compared to just one characteristic angle in the 1D HCG-HW (e.g., FIG. 3), the 2D HCG-HW cladding grating has two incident characteristic angles, $\theta$ and $\phi$, which are the angle between incident beam and y-z plane and the angle between incident beam and x-z plane, respectively. For specific values of $\theta$ and $\phi$, high reflectivity can be obtained by optimizing the grating dimensions using RCWA. Considering the round trip ray trace of FIG. 13, $$k_x = k\sin\theta = 2\pi\sin\theta/\lambda, \ldots k_x D_x = m\pi; \; m=1,2,\ldots$$

$$k_y = k\sin\phi = 2\pi\sin\phi/\lambda, \ldots k_y D_y = m\pi; \; n=1,2,\ldots$$

where (m,n) are mode numbers. The helical "threading through" aspect of this waveguide mode is similar to the HE modes in fiber.

As with 1D HCG-HW loss calculation, ray optics and RCWA simulation can be utilized for estimating the loss in a 2D rectangular HW-HCG for a different mode (m,n). To achieve high reflectivity with all four cladding gratings, the dimensions of the top and bottom HCGs are designed to be different from those of the left and right HCGs. By way of example and not limitation, for the top HCGs, $\Lambda=674$ nm, $t_g=460$ nm and $\eta=46\%$. The bottom HCG sits on 2.5 μm SiO$_2$ and the dimensions used for it in this example are $\Lambda=570$ nm, $t_g=390$ nm and $\eta=46\%$, whereas for left and right HCGs, $\Lambda=622$ nm, $t_g=782$ nm, $\eta=80\%$. It should be noted that this structure only supports low loss propagation for one mode and one polarization, in this case, HE (1,1) mode where the majority of E-field components are along y direction. For a 25 μm by 25 μm hollow-core waveguide with these HCG claddings, the loss of the fundamental mode (1,1) is estimated to be ~0.009 dB/m.

Figure 14:
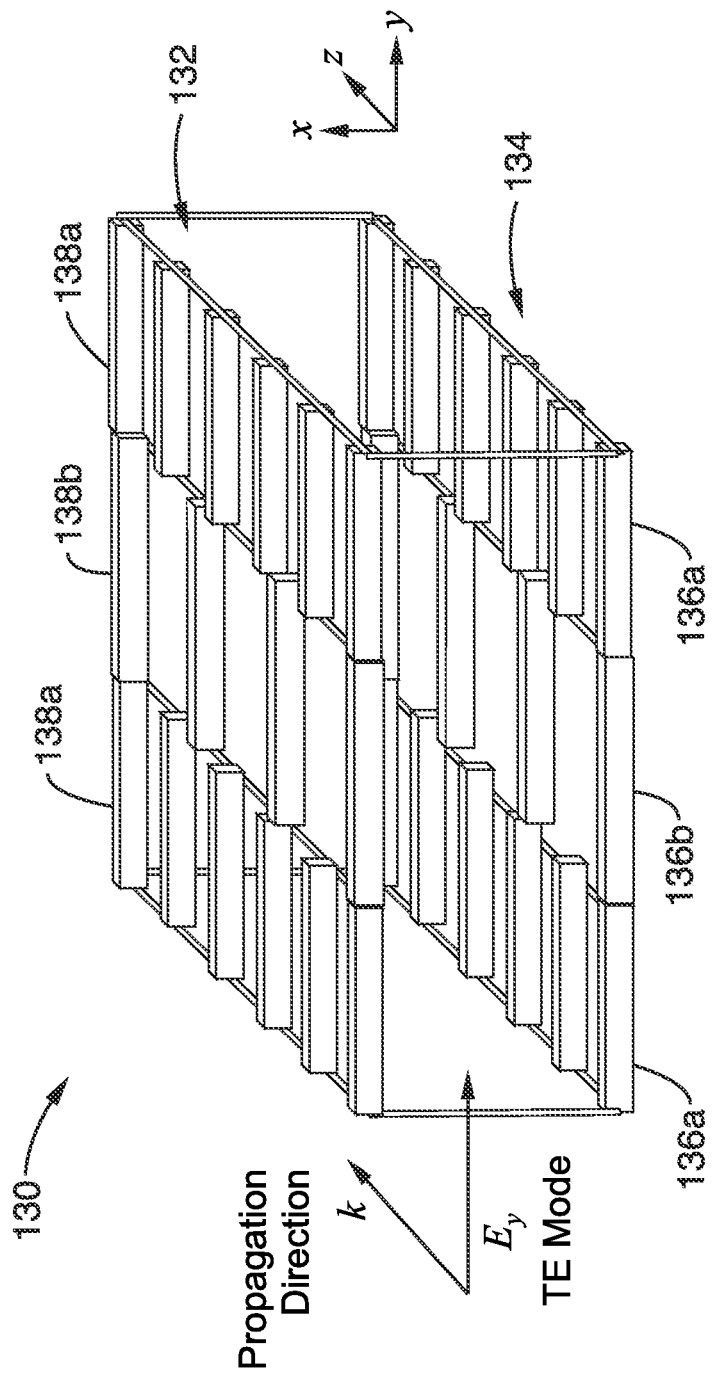
FIG. 14 is a schematic of a heterostructure geometry of a HCG-HW having portions along the propagation direction of at least one of the HCGs having a different period, according to an aspect of the present invention.

FIG. 14 illustrates an example embodiment 130 of a hollow-core waveguide based on photonic heterostructure geometry having a transverse core and cladding formed by HCGs with different periods. Transverse confinement is achieved due to effective index difference between core and cladding regions. These HCGs have a different $\phi_R$ and therefore different effective index. Transverse guidance follows when the core effective index is greater than that of the cladding. In the heterostructure HCG waveguide (as shown) all the HCGs have an identical region with the same altered periodicity. A hybrid heterostructure is formed when not all the HCGs have the region of altered periodicity, or when different HCGs have regions of altered periodicity which are not altered to the same period.

Figures 15, 16:
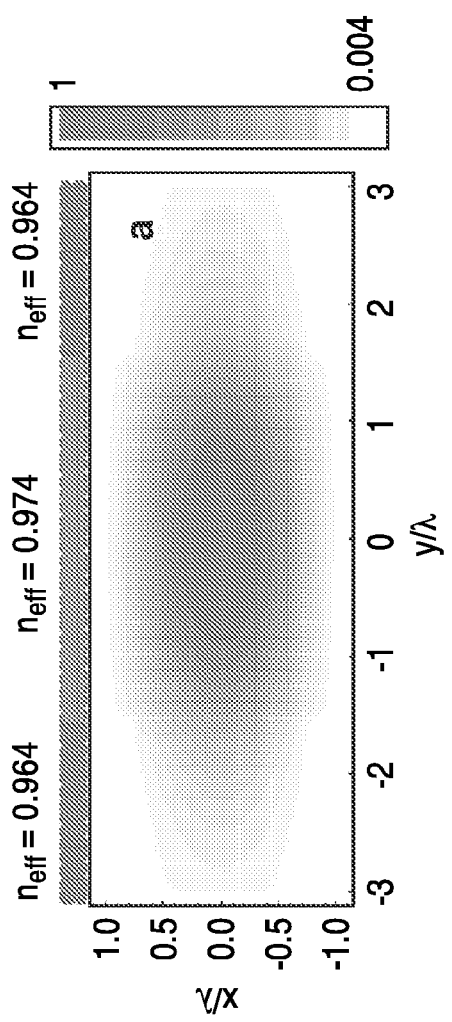
FIG. 15 is a graph of confinement for the heterostructure geometry shown in FIG. 14, according to an aspect of the present invention.
FIG. 16 is a schematic of a spiral waveguide embodiment according to an aspect of the present invention, showing a single HCG-HW, wound in a spiral having maximized bending radius.

FIG. 15 depicts confinement provided by the heterostructure geometry of FIG. 14 showing the structure analyzed in the lateral direction (y) in response to the effective index method.

The design of the heterostructure of FIG. 14 relies on the phase shift $\phi_R$ experienced by a ray upon reflection from an HCG. This phase shift can be tuned by adjusting the HCG parameters and effects the slab waveguide mode by modifying the phase matching condition given in the ray optics approximation:

$$\frac{2\pi}{\lambda}\sin\theta \cdot D + \phi_R = m\pi$$

In general, a change in $\phi_R$ changed the characteristic $\theta$ of the mode, and hence the effective index. By way of example and not limitation, waveguide height is 3.2 μm and the width is 4.65 μm. The grating period in the core and the cladding region are chosen as 0.698 μm and 0.3875 μm respectively. In this case, an effective index difference of 1% is obtained between the core and the cladding regions. It should be noted that this specific implementation is an example only, it is possible to design this photonic heterostructure by mechanisms such as: (1) holding the period constant and varying the duty cycle, (2) varying both period and duty cycle, (3) varying the angle of the gratings relative to the propagation direction, or combinations thereof.

10. Wavequide Bends.

FIG. 16 illustrates an example spiral waveguide embodiment 150 for providing a long optical path in a small area with a minimum of small-radius bending. The waveguide can be generally considered to be formed into a compact structure having parallel adjacent first and second elongate sections 152, 154 to a spiral depth 156, and which transition between one another in the center of the spiral. A bending transition region 158 within the interior of the spiral has an s-shaped transition with a bending radius of approximately one-half the minimum radius of the spiral pattern.

It should be recognized that optical path length of HCG-HW is a crucial specification for applications that benefit from long propagation times, e.g. compact optical delay lines. To fit long HCG-HW into small area footprints, it is necessary to fabricate turns or bends in the wave guide, such as the spiral waveguide geometry shown in the figure. Bending will generally lead to increased loss, known as bending loss which can be analyzed using the effective index method, as described earlier.

The bending loss can be then approximated based on $n_{eff}$ using the WKB approximation given by:

$$\alpha \approx \frac{\exp(-2NZ)}{2R\sqrt{1-(n_{eff}/n_{in})^2}}$$

where $$N = \frac{2\pi R}{\lambda/n_{eff}}$$

is the number of wavelengths within a waveguide ring of radius R, and $$Z = atanh(\sqrt{1-(n_{out}/n_{eff})^2})-\sqrt{1-(n_{out}/n_{eff})^2}$$

By way of example and not limitation, the spiral waveguide is shown using a heterostructure or rectangular waveguide, although it will be appreciated that different waveguides according to the present invention may be alternatively utilized. The waveguide is divided into three regions the core and the two outer cladding regions; where "cladding" in this case refers to transverse confinement. Each area of the waveguide is approximated as a slab waveguide with its effective refractive index, $n_{in}$ for the core and $n_{out}$ for the cladding. Furthermore, the combined effective modal refractive index is given by:

$$n_{eff} = \sqrt{n_{in}^2 - \left(\frac{k}{2\pi/\lambda}\right)^2}$$

where k is the solution of a dielectric slab waveguide dispersion relation for TE modes:

$$\left(\frac{2\pi}{\lambda}\right)^2 (n_{in}^2 - n_{out}^2) - k^2 = k^2 \tan^2(kW_{in}/2)$$

Figure 17:
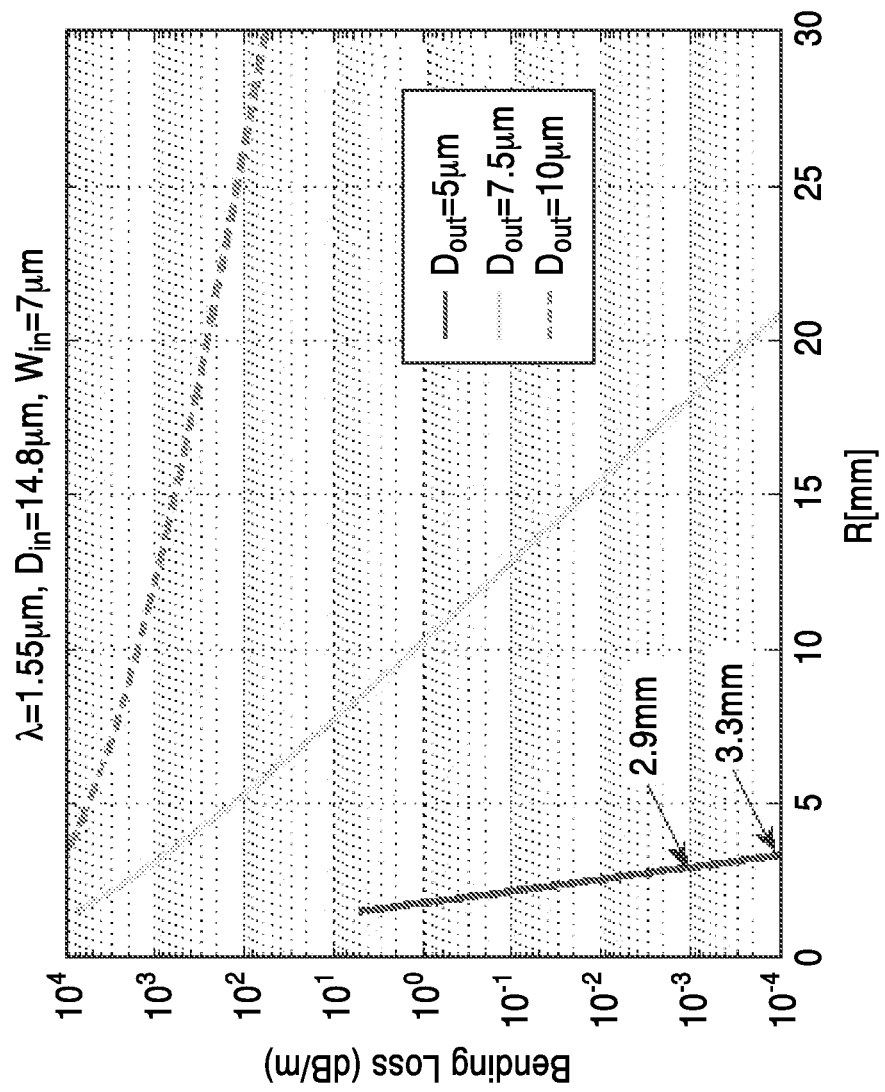
FIG. 17 is a graph of bending loss as a function of bending radius in relation to FIG. 16.

FIG. 17 depicts bending loss as a function of the bending radius for three different heights $\Delta D = (D_{in}-D_{out})$ for the waveguide arrangement of FIG. 16. When the waveguide is high ($D_{out}$=5 μm), bending radius of 2.9 mm is shown to provide bending loss as low as $10^{-3}$ dB/m. The graph demonstrates that a high waveguide ($D_{in}$=14.8 μm, $D_{out}$=5 μm) would provide bending losses as low as $10^{-4}$-$10^{-3}$ $dB/m$ for bending radii between 2.9 mm and 3.3 mm, due to the high modal confinement. Height, therefore, requires is a tradeoff between the bending loss and the loss associated with ridge leakage, discussed above. Based on the layout shown in FIG. 16 and assuming a waveguide width of $W_{in}+2W_{out}$=15 μm and a minimum bending radius of R=2.9 mm, the waveguide length accommodated by a 3 cm×3 cm area is approximately 40 m, allowing a 10 cm² chip to provide approximately 134 ns of optical delay.

11. Other Embodiments.

The present invention is amendable to being embodied in numerous different ways and variations without departing from the teachings of the present invention. The following details just a few examples by way of illustration.

Figure 19:
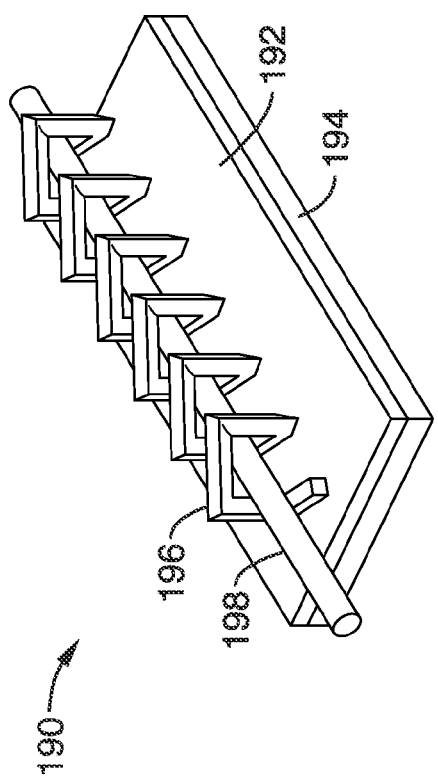
FIG. 19 is a schematic of an HCG-HW in a 2D rectangular helical configuration with offset segments, according to an aspect of the present invention.
Figure 18:
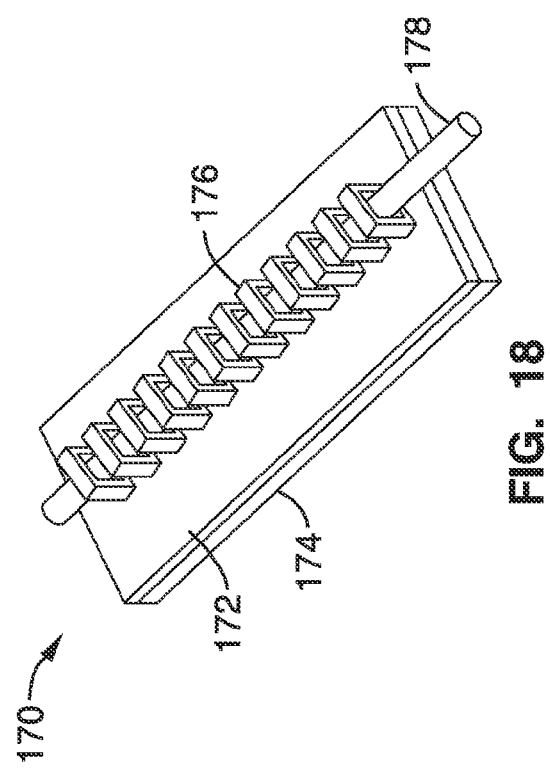
FIG. 18 is a schematic of an HCG-HW in a 2D rectangular configuration with offset segments, according to an aspect of the present invention.

FIG. 18-FIG. 19 illustrate two example embodiments 170, 190 of 2D HCG-HWs according to the present invention. In these embodiments the gratings generally "wrap" around the light beam core like the stripes on a candy cane and are similar to that shown previously in FIG. 12. FIG. 18 depicts an embodiment 170 with tilted rectangular segments 176 of high refractive index material on a low index base 172 shown by way of example on a substrate 174. Each "tilted" rectangular segment of the HCG still provide periodicity at the bottom along the propagation direction while the periodicity of the top is tilted at an azimuthal angle. FIG. 19 depicts an embodiment 190 with showing a "spiral" design with spiral segments 196 on a low index base 192 shown by way of example on substrate 194. In this design, both top and bottom gratings have periodicity tilted at azimuthal angles relative to propagation, in this particular case +/−30 degrees.

12. Applications.

12.1 Compact Optical Delay Line.

A core application of HCG-HW is a compact optical delay. Essentially, the tight optical confinement and lithographic fabrication allows long optical path in a small foot print. Such structures can be directly fabricated on silicon using CMOS compatible techniques, allowing control electronics and optical components to share the same substrate and processing.

12.2 Advanced Optical Filters.

Filters with arbitrary frequency responses may be constructed from a weighted sum of time-delayed copies of a signal, e.g. transversal filters. Such filters may function either in the optical domain itself, or may operate on RF modulation of the an optical carrier. HCG-HW delay lines provide a more compact solution than fiber or coaxial cable, and are capable of carrying larger signal power with lower loss and lower nonlinear distortion than traditional integrated optics solutions.

12.3 True-Time Delay for Phased Array Antennas.

Uniform delay over very broad RF bandwidth prevents modulation of antenna directivity due to finite signal bandwidth, i.e., the "squinting" problem. By taking advantage of the ultra-low nonlinearity of HCG-HW, RF-on-optical signals of significantly higher power may be processed. For some applications this may eliminate the need for RF amplification at the end of each delay line, allowing optical receivers to directly drive antenna elements.

12.4 Data Packet Traffic Engineering.

A "transparent," format agnostic switch or router in an optical communications network has many requirements for temporal shift of incoming data packets. These range from long-term storage (buffering) to small shifts for packet synchronization and retiming. Chip-based solutions will require delay lines with extremely low loss. Broad optical bandwidth is necessary for wavelength division multiplexing (WDM). HCG-HW excel in all of these areas.

12.5 Interferometric Sensors.

Optical sensing and spectroscopic analysis relies upon changes in refractive index or absorption due to the presence of an analyte. Long optical paths and interaction times allow small concentration of analytes to produce detectable signals. Waveguides offer long optical paths in a very small area without the need for complex optical alignment. A particular advantage of the HCG-HW is that the open walls allow rapid diffusion of any potential analyte into the core, where optical intensity is high. The results in greatly enhanced response times relative to other hollow waveguide designs. The broad bandwidth of the HCG-HW will allow a broader range of wavelengths to share the same waveguide, enabling higher selectivity in detection.

12.6 On-Chip Optical Communication.

As processor architecture moves towards increasing parallelism, communication between cores and memory becomes the primary limitation on computation speed. Optical data transfer between chips on a common substrate and possibly between cores on a single chip promises very high bandwidth in a small space. Waveguides operating in such environments are generally required to have very low loss due to strict power budgets, and should be substantially temperature insensitive to thermal fluctuations across the chip, and should provide high levels of optical confinement due to tight restrictions on available area. It will be appreciated HCG-HW can be optimized according to the teachings of the present invention toward fulfilling all of these characteristics.

As can be seen, therefore, the present invention provides methods and apparatus for guiding incident light wavelengths through a hollow core between opposing HCG faces. Inventive teachings can be applied in a variety of apparatus and applications.

As can be seen, therefore, the present invention includes the following inventive embodiments, implementations, modes and features, among others:

1. An apparatus for guiding light propagation, comprising: a first subwavelength grating layer comprising a first plurality of periodically spaced apart segments of high refractive index material in a grating plane having a selected periodicity between which is disposed low refractive index material; a second subwavelength grating layer comprising a second plurality of periodically spaced apart segments of high refractive index material having a selected periodicity between which is disposed low refractive index material; and a core separating said first and said second subwavelength gratings by a predetermined distance which forms a hollow core through which an incident light beam, having a given wavelength, is propagated along a propagation direction; wherein said core is configured for receiving the incident light beam between the first and second subwavelength gratings and providing lateral confinement in response to glancing reflections from grating segments of said first and second subwavelength grating layers as the incident light beam traverses said core.

2. An apparatus according to embodiment 1, wherein said confinement within said core is in response to destructive interference which arises between multiple grating harmonics in a subwavelength periodic structure.

3. An apparatus according to embodiment 1, wherein periodicity of grating segments within said first and second subwavelength gratings is transverse to the propagation direction of said incident light.

4. An apparatus according to embodiment 1, wherein said incident light beam is bounced between segments of high refractive index material as it travels through the core.

5. An apparatus according to embodiment 1, wherein said first and second subwavelength grating layers have a period (Λ) which is less than or to the wavelength of the incident light in the medium with the lowest refractive index.

6. An apparatus according to embodiment 1: wherein light beam incidence angle is measured from the plane of the grating; and wherein an angle of incidence (θ) of said incident light beam with respect to the plane of the first and second subwavelength gratings is determined in response to selection of period (Λ), thickness ($t_g$) and duty cycle (η) for said subwavelength gratings.

7. An apparatus according to embodiment 1, wherein said segments of said subwavelength gratings comprise linear or curved lines of high refractive index material.

8. An apparatus according to embodiment 1, wherein said first and second subwavelength grating on either side of said core direct the incident light beam in response to glancing reflectivity, instead of backward wave reflection caused by traditional periodic structures.

9. An apparatus according to embodiment 1, wherein in response to subwavelength structures of said first and second subwavelength grating layers, only the zeroeth order mode is propagated by reflection while higher order modes are evanescent.

10. An apparatus according to embodiment 1: wherein high reflectivity of said subwavelength grating is determined in response to proper choice of grating parameters, for period, thickness and duty cycle; and wherein the high reflectivity is achieved in response to destructive interference between the directly transmitted wave and a Bragg transmitted wave.

11. An apparatus according to embodiment 1, further comprising: a third and fourth subwavelength grating layer of periodically spaced apart segments of high refractive index material having a selected periodicity between which is disposed low refractive index material; and wherein said third and fourth subwavelength grating layers face one another on parallel planes which are perpendicular to and disposed between said first and second subwavelength gratings and on either side of said core.

12. An apparatus according to embodiment 1, further comprising at least one portion of said first and/or second plurality of periodically spaced apart segments of high refractive index material, extending along a propagation direction between said first and second subwavelength grating, which has a different periodicity.

13. An apparatus according to embodiment 1, wherein said first and second subwavelength gratings are configured with different duty cycles.

14. An apparatus according to embodiment 1, wherein said first plurality of high index segments and said second plurality of high index segments are disposed, having identical orientation and periodicity, facing one another on parallel planes on either side of said core;

15. An apparatus according to embodiment 1, wherein said low refractive index material comprises air.

16. An apparatus for guiding light propagation, comprising: a plurality of subwavelength grating layers having at least a first and second subwavelength grating layer, with each subwavelength grating layer having a plurality of spaced apart segments of high refractive index material having a selected orientation and periodicity; and a core separating said first and said second subwavelength gratings by a predetermined distance which forms a hollow core through which an incident light beam, having a given wavelength, is propagated along a propagation direction; wherein said subwavelength grating are paired on opposing sides of said core and facing said core; wherein said core is configured for receiving an incident light beam between at least said first and second subwavelength gratings and providing confinement thereof in response to glancing reflections as the incident light beam propagates through said core.

17. An apparatus according to embodiment 16: wherein light beam incidence angle is measured from a plane of the grating; and wherein an angle of incidence (θ) of said incident light beam with respect to the plane of the first and second subwavelength gratings is determined in response to selection of period (Λ), thickness ($t_g$) and duty cycle (η) for said subwavelength gratings.

18. An apparatus according to embodiment 16, wherein a first, second, third and fourth subwavelength grating layers form a quadrilateral plane figure extending in the propagation direction of said apparatus and enclosing said core; and wherein said quadrilateral plane figures are either perpendicular to the propagation direction or positioned at a diagonal.

19. An apparatus according to embodiment 16, wherein each of said quadrilateral plane figures is joined to one another forming a segmented spiral.

20. An apparatus according to embodiment 16, further comprising at least one portion of said first and/or second plurality of periodically spaced apart segments of high refractive index material, extending along a propagation direction between said first and second subwavelength grating, which has a different periodicity.

21. An apparatus according to embodiment 16, further comprising at least one portion of said first and/or second plurality of periodically spaced apart segments of high refractive index material, extending along a propagation direction between said first and second subwavelength grating, which has a different duty cycle.

22. An apparatus for guiding light propagation, comprising: a waveguide having a plurality of subwavelength grating layers as segments of high refractive index material having a selected orientation and periodicity; a core disposed between one or more pairs of subwavelength grating layers in which the grating in the pair face one another on opposite sides of said core which comprises a hollow waveguide; wherein said waveguide is formed with a first elongate section, second elongate section and transition section; wherein said first and second elongate sections are disposed parallel to one another following a circular path in a spiral pattern; wherein said first section transitions to said second section within an interior of said spiral pattern in an s-shaped transition having a bending radius of approximately one-half of a minimum radius found in within said spiral pattern.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for guiding light propagation, comprising:
a first subwavelength grating layer comprising a first plurality of periodically spaced apart segments of high refractive index material in a grating plane having a selected periodicity between which is disposed low refractive index material;
a second subwavelength grating layer comprising a second plurality of periodically spaced apart segments of high refractive index material having a selected periodicity between which is disposed low refractive index material; and
a core separating said first and said second subwavelength gratings by a predetermined distance which forms a hollow core through which an incident light beam, having a given wavelength, is propagated along a propagation direction;
wherein said core is configured for receiving the incident light beam between the first and second subwavelength gratings and providing lateral confinement in response to glancing reflections from grating segments of said first and second subwavelength grating layers as the incident light beam traverses said core.

2. An apparatus as recited in claim 1, wherein said confinement within said core is in response to destructive interference which arises between multiple grating harmonics in a subwavelength periodic structure.

3. An apparatus as recited in claim 1, wherein periodicity of grating segments within said first and second subwavelength gratings is transverse to the propagation direction of said incident light.

4. An apparatus as recited in claim 1, wherein said incident light beam is bounced between segments of high refractive index material as it travels through the core.

5. An apparatus as recited in claim 1, wherein said first and second subwavelength grating layers have a period ($\Lambda$) which is less than or equal to the wavelength of the incident light in the medium with the lowest refractive index.

6. An apparatus as recited in claim 1:
wherein light beam incidence angle is measured from the plane of the grating; and
wherein an angle of incidence ($\theta$) of said incident light beam with respect to the plane of the first and second subwavelength gratings is determined in response to selection of period ($\Lambda$), thickness ($t_g$) and duty cycle ($\eta$) for said subwavelength gratings.

7. An apparatus as recited in claim 1, wherein said segments of said subwavelength gratings comprise linear or curved lines of high refractive index material.

8. An apparatus as recited in claim 1, wherein said first and second subwavelength grating on either side of said core direct the incident light beam in response to glancing reflectivity, instead of backward wave reflection caused by traditional periodic structures.

9. An apparatus as recited in claim 1, wherein in response to subwavelength structures of said first and second subwavelength grating layers, only the zeroeth order mode is propagated by reflection while higher order modes are evanescent.

10. An apparatus as recited in claim 1:
wherein high reflectivity of said subwavelength grating is determined in response to proper choice of grating parameters, for period, thickness and duty cycle; and
wherein the high reflectivity is achieved in response to destructive interference between the directly transmitted wave and a Bragg transmitted wave.

11. An apparatus as recited in claim 1, further comprising:
a third and fourth subwavelength grating layer of periodically spaced apart segments of high refractive index material having a selected periodicity between which is disposed low refractive index material; and
wherein said third and fourth subwavelength grating layers face one another on parallel planes which are perpendicular to and disposed between said first and second subwavelength gratings and on either side of said core.

12. An apparatus as recited in claim 1, further comprising at least one portion of said first and/or second plurality of periodically spaced apart segments of high refractive index material, extending along a propagation direction between said first and second subwavelength grating, which has a different periodicity.

13. An apparatus as recited in claim 1, wherein said first and second subwavelength gratings are configured with different duty cycles.

14. An apparatus as recited in claim 1, wherein said first plurality of high index segments and said second plurality of high index segments are disposed, having identical orientation and periodicity, facing one another on parallel planes on either side of said core.

15. An apparatus as recited in claim 1, wherein said low refractive index material comprises air.

16. An apparatus for guiding light propagation, comprising:
a plurality of subwavelength grating layers having at least a first and second subwavelength grating layer, with each subwavelength grating layer having a plurality of spaced apart segments of high refractive index material having a selected orientation and periodicity; and
a core separating said first and said second subwavelength gratings by a predetermined distance which forms a hollow core through which an incident light beam, having a given wavelength, is propagated along a propagation direction;
wherein said subwavelength grating are paired on opposing sides of said core and facing said core;
wherein said core is configured for receiving an incident light beam between at least said first and second subwavelength gratings and providing confinement thereof in response to glancing reflections as the incident light beam propagates through said core.

17. An apparatus as recited in claim 16:
wherein light beam incidence angle is measured from a plane of the grating; and
wherein an angle of incidence ($\theta$) of said incident light beam with respect to the plane of the first and second subwavelength gratings is determined in response to selection of period ($\Lambda$), thickness ($t_g$) and duty cycle ($\eta$) for said subwavelength gratings.

18. An apparatus as recited in claim 16,
wherein a first, second, third and fourth subwavelength grating layers form a quadrilateral plane figure extending in the propagation direction of said apparatus and enclosing said core; and
wherein said quadrilateral plane figures are either perpendicular to the propagation direction or positioned at a diagonal.

19. An apparatus as recited in claim 16, wherein each of said quadrilateral plane figures is joined to one another forming a segmented spiral.

20. An apparatus as recited in claim 16, further comprising at least one portion of said first and/or second plurality of periodically spaced apart segments of high refractive index material, extending along a propagation direction between said first and second subwavelength grating, which has a different periodicity.

21. An apparatus as recited in claim 16, further comprising at least one portion of said first and/or second plurality of periodically spaced apart segments of high refractive index material, extending along a propagation direction between said first and second subwavelength grating, which has a different duty cycle.

22. An apparatus for guiding light propagation, comprising:
a waveguide having a plurality of subwavelength grating layers as segments of high refractive index material having a selected orientation and periodicity;
a core disposed between one or more pairs of subwavelength grating layers in which the grating in the pair face one another on opposite sides of said core which comprises a hollow waveguide;
wherein said waveguide is formed with a first elongate section, second elongate section and transition section;
wherein said first and second elongate sections are disposed parallel to one another following a circular path in a spiral pattern;

wherein said first section transitions to said second section within an interior of said spiral pattern in an s-shaped transition having a bending radius of approximately one-half of a minimum radius found in within said spiral pattern.

* * * * *